United States Patent
Kumar et al.

(10) Patent No.: US 11,599,771 B2
(45) Date of Patent: Mar. 7, 2023

(54) RECURRENT NEURAL NETWORKS WITH DIAGONAL AND PROGRAMMING FLUCTUATION TO FIND ENERGY GLOBAL MINIMA

(71) Applicant: Hewlett Packard Enterprise Development LP, Houston, TX (US)

(72) Inventors: Suhas Kumar, Palo Alto, CA (US); Thomas Van Vaerenbergh, Palo Alto, CA (US); John Paul Strachan, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 867 days.

(21) Appl. No.: 16/260,898

(22) Filed: Jan. 29, 2019

(65) Prior Publication Data
US 2020/0242447 A1 Jul. 30, 2020

(51) Int. Cl.
*G06N 3/06* (2006.01)
*G06N 3/08* (2006.01)
*G06N 3/04* (2023.01)
*G06N 3/063* (2023.01)

(52) U.S. Cl.
CPC ......... *G06N 3/0445* (2013.01); *G06N 3/0635* (2013.01); *G06N 3/08* (2013.01)

(58) Field of Classification Search
CPC ....... G06N 3/0445; G06N 3/0636; G06N 3/08
See application file for complete search history.

(56) References Cited

U.S. PATENT DOCUMENTS

| | | | |
|---|---|---|---|
| 9,691,479 B1 | 6/2017 | Grafals et al. | |
| 10,490,182 B1* | 11/2019 | Madhavaraj | G10L 15/063 |
| 2013/0311412 A1* | 11/2013 | Lazar | H03M 1/82 |
| | | | 706/16 |
| 2019/0019538 A1* | 1/2019 | Li | G11C 7/12 |
| 2019/0286970 A1* | 9/2019 | Karaletsos | G06N 3/08 |
| 2021/0342678 A1* | 11/2021 | Mostafa | G06N 3/084 |

FOREIGN PATENT DOCUMENTS

WO WO-2018007783 A1 1/2018

OTHER PUBLICATIONS

Hassan, Amr M., Hai Helen Li, and Yiran Chen. "Hardware implementation of echo state networks using memristor double crossbar arrays." 2017 International Joint Conference on Neural Networks (IJCNN). IEEE, 2017. (Year: 2017).*

(Continued)

*Primary Examiner* — Hal Schnee
(74) *Attorney, Agent, or Firm* — Sheppard Mullin Richter & Hampton LLP

(57) ABSTRACT

Recurrent neural networks, and methods therefor, are provided with diagonal and programming fluctuation to find energy global minima. The method may include storing the matrix of weights in memory cells of a crossbar array of a recursive neural network prior to operation of the recursive neural network; altering the weights according to a probability distribution; setting the weights to non-zero values in at least one of the memory cells in a diagonal of the memory cells in the crossbar array; and operating the recursive neural network.

17 Claims, 8 Drawing Sheets

(56) References Cited

OTHER PUBLICATIONS

Lastras-Montano, Miguel Angel, at al. "3D-DPE: A 3D high-bandwidth dot-product engine for high-performance neuromorphic computing." Design, Automation & Test in Europe Conference & Exhibition (DATE), 2017. IEEE, 2017. (Year: 2017).*

Guo, Xinjie, et al. "Modeling and experimental demonstration of a Hopfield network analog-to-digital converter with hybrid CMOS/memristor circuits." Frontiers in neuroscience 9 (2015): 488. (Year: 2015).*

S.G. Hu et al., "Associative Memory Realized by a Configurable Memristive Hopfiled Neural Network," Nature Communications, Jun. 25, 2015, pp. 1-8, Macmillan Publishers Limited.

\* cited by examiner

RECURRENT NEURAL NETWORKS WITH DIAGONAL AND PROGRAMMING FLUCTUATION TO FIND ENERGY GLOBAL MINIMA

DESCRIPTION OF RELATED ART

Artificial neural networks are a family of technical models based on biological nervous systems, and are used to estimate or approximate functions that depend on a large number of inputs. Neural networks may be represented as a system of interconnected "neurons" which exchange messages between each other. The connections may have numerical weights that can be tuned based on experience, making neural networks adaptive to inputs and capable of machine learning. Artificial neural networks may have a variety of applications, including function approximation, classification, data processing, robotics, and computer numerical control.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Recurrent artificial neural networks are often employed to solve computationally-difficult problems by minimizing the "energy" of the network, where the energy represents the states of the nodes of the network. But while seeking a global minimum of the energy, such networks often converge at a local minimum instead. Numerous strategies have been proposed to prevent this error.

These computationally-difficult problems are often expressed in the form of a Hamiltonian matrix, which may be programmed into the crossbar array of a recurrent neural network. By definition, the values of the diagonal elements of the Hamiltonian matrix are set to zero because otherwise the positive feedback generated by nonzero diagonal elements may cause the network to become unstable, with the energy rising rather than falling as desired.

In some embodiments of the disclosed technology, nonzero diagonal elements are introduced to the network. The values of these elements are selected to introduce controlled instability to the network that is sufficient to prevent convergence at a local minimum. The values of the diagonal elements may be adjusted during operation as the network converges to a global minimum.

In some embodiments of the disclosed technology, the weights of the neural network are adjusted using a probabilistic distribution prior to operation of the network. This process introduces noise into the network, which prevents convergence at a local minimum. And because the noise function is known, it can be removed during operation as the network converges to a global minimum.

In various embodiments, these techniques may be used alone or in combination.

Figure 1:
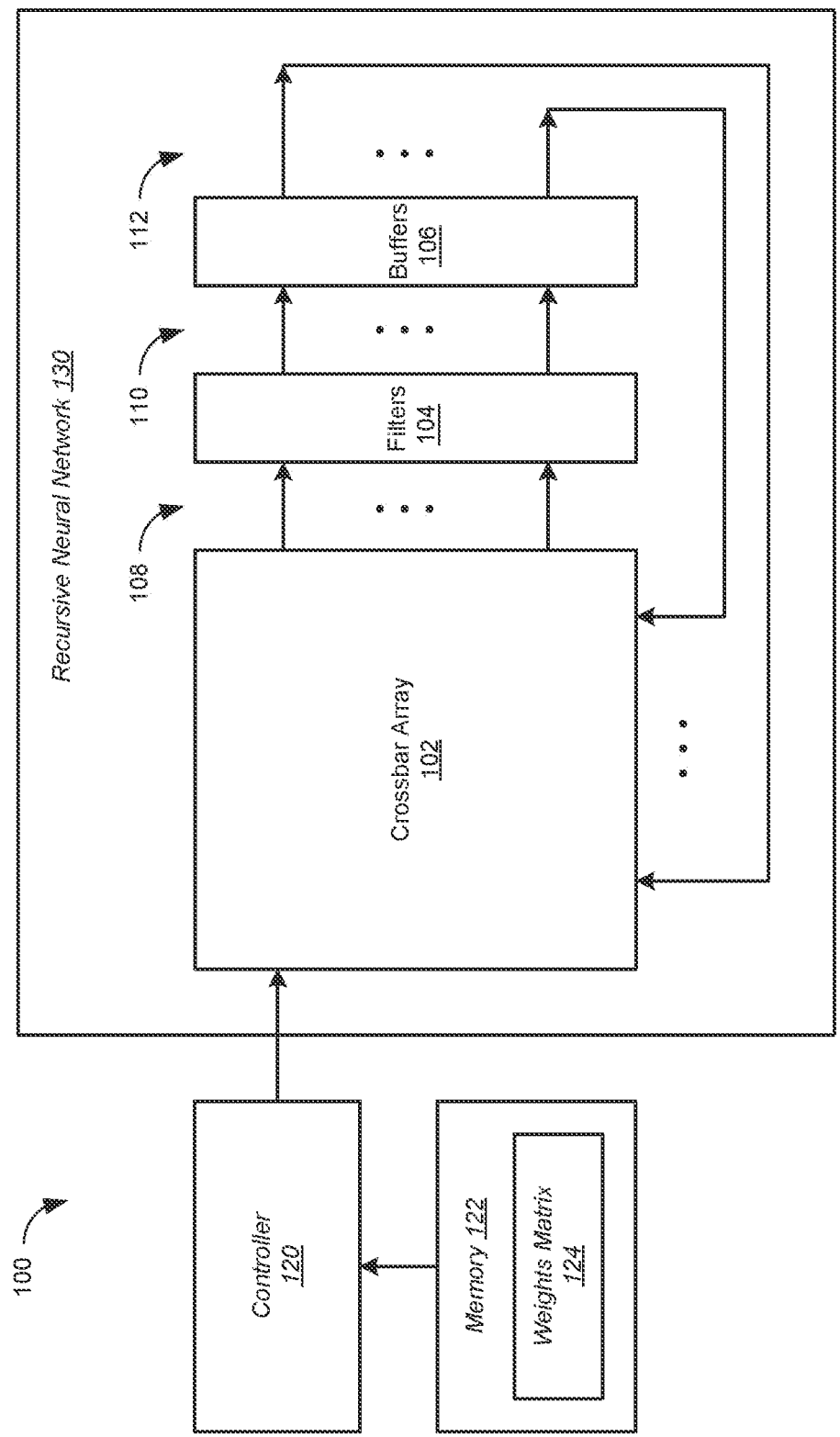
FIG. 1 illustrates a recursive neural network system according to one embodiment of the disclosed technology.
Figure 2:
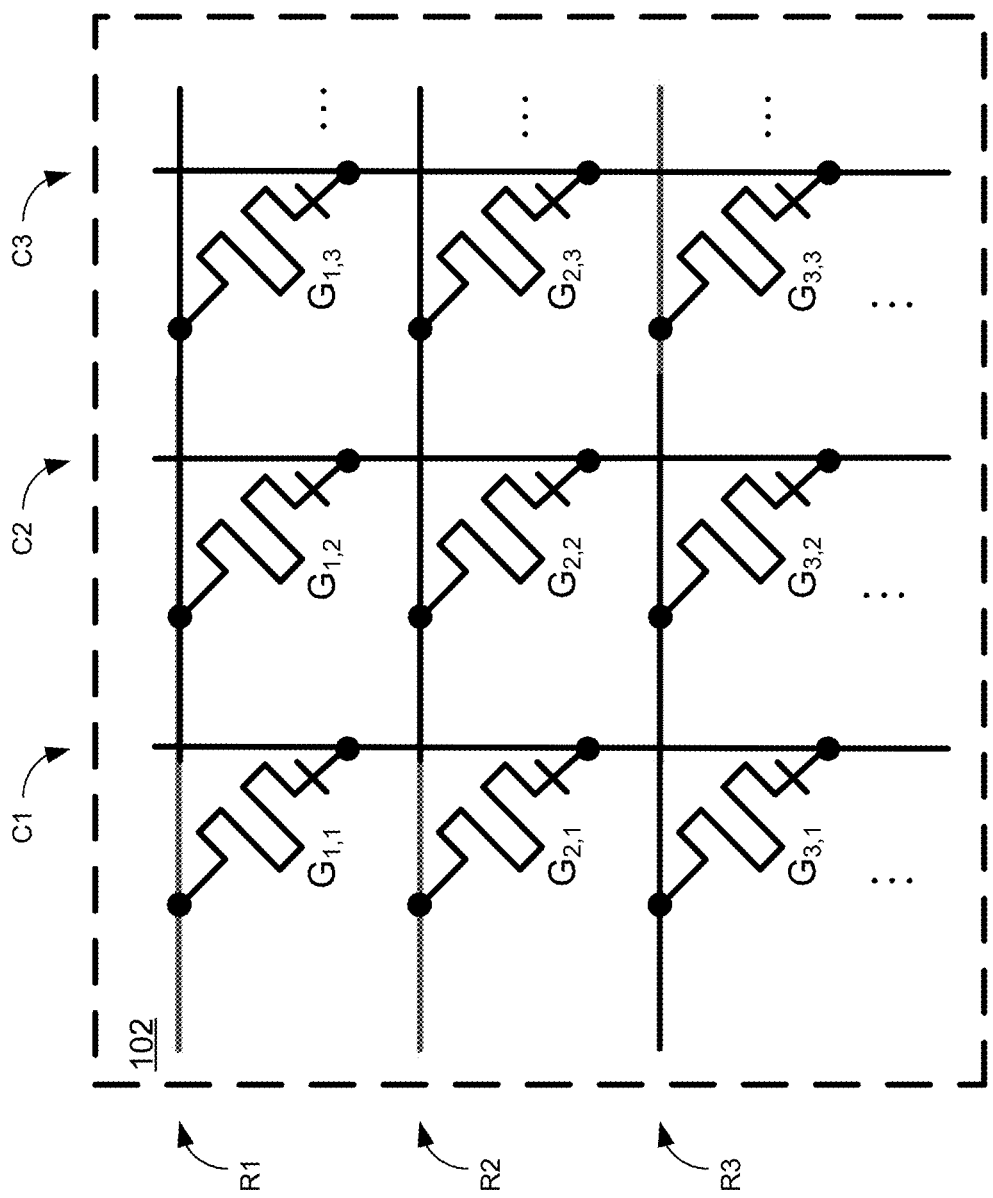
FIG. 2 illustrates a crossbar array according to one embodiment of the disclosed technology.

FIG. 1 illustrates a recursive neural network system according to one embodiment of the disclosed technology. Referring to FIG. 1, the recursive neural network system 100 may include a recursive neural network 130. The recursive neural network may include a crossbar array 102. FIG. 2 illustrates a crossbar array 102 according to one embodiment of the disclosed technology. Referring to FIG. 2, the crossbar array 102 includes a plurality of row lines R, with three row lines R1, R2, and R3 shown. The crossbar array 102 also includes a plurality of column lines C, with three column lines C1, C2, and C3 shown. The crossbar array 102 also includes a plurality of memory cells G. Each memory cell G is coupled between a respective combination of one of the row lines R and one of the column lines C. For example, memory cell $G_{1,1}$ is coupled between row line R1 and column line C1. The crossbar array 102 may be of any suitable dimensions.

Prior to operation of the crossbar array 102, a matrix of weights may be stored in the memory cells G. During operation of the crossbar array 102, the column lines C may receive inputs according to an input vector, and each row line may deliver an output representing a dot-product of the input vector and the weights in the row line.

The memory elements G of the crossbar array 102 may be implemented as memristors. Memristors are devices that may be used as components in a wide range of electronic circuits, such as memories, switches, radio frequency circuits, and logic circuits and systems. In a memory structure, a crossbar array of memory devices having memristors may be used. In memory devices, memristors may be used to store bits of information, 1 or 0. The resistance of a memristor may be changed by applying an electrical stimulus, such as a voltage or a current, through the memristor. Generally, at least one channel may be formed that is capable of being switched between two states—one in which the channel forms an electrically conductive path ("on") and one in which the channel forms a less conductive path ("off"). In some other cases, conductive paths represent "off" and less conductive paths represent "on". Furthermore, memristors may also behave as an analog component with variable conductance.

In some applications, a memory crossbar array may be used to perform vector-matrix computations. For example, an input voltage signal from each column line of the crossbar is weighted by the conductance of the resistive devices in each row line and accumulated as the current output from each row line. Ideally, if wire resistances can be ignored, the current (I) flowing out of the crossbar array will be approximately represented in the equation below:

$$I^T = V^T G \qquad (1)$$

where V is the input voltage and G is the conductance matrix.

The memristor crossbar array is configured to include contributions from each memristor in the crossbar array. The use of memristors at junctions or cross-points of the crossbar array enables programming the resistance (or conductance) at each such junction.

Referring again to FIG. 1, the recursive neural network 130 may include one or more filters 104. The filters 104 receive outputs 108 from the row lines R of the crossbar array 102, and generate a new input vector 110 for the crossbar array 102 based on the outputs 108. The filters may be linear or nonlinear, and may include simple filters such as thresholding filters, complex filters such as sigmoid filters, other filters, and combinations thereof.

The recursive neural network 130 may include one or more buffers 106. The buffers 106 store the new input vector 110, and provide signals 112 representing the new input vector 110 to the column lines C of the crossbar array 102.

The recursive neural network system 100 may include a memory 122 to store a weights matrix 124. The weights matrix 124 may represent a problem to be solved. The problem to be solved may include an NP-hard problem such as the traveling salesman problem, Max-cut problem, job or airline scheduling problem, or the like. The problem may be expressed as a Hamiltonian matrix.

The recursive neural network system 100 may include a controller 120. The controller 120 may program the weights matrix 124 into the memory elements G of the crossbar array 102. The controller 120 may also perform other functions, such as those described herein. The controller 120 may be implemented as a processor, a dedicated circuit, or the like, or combinations thereof.

Figure 3:
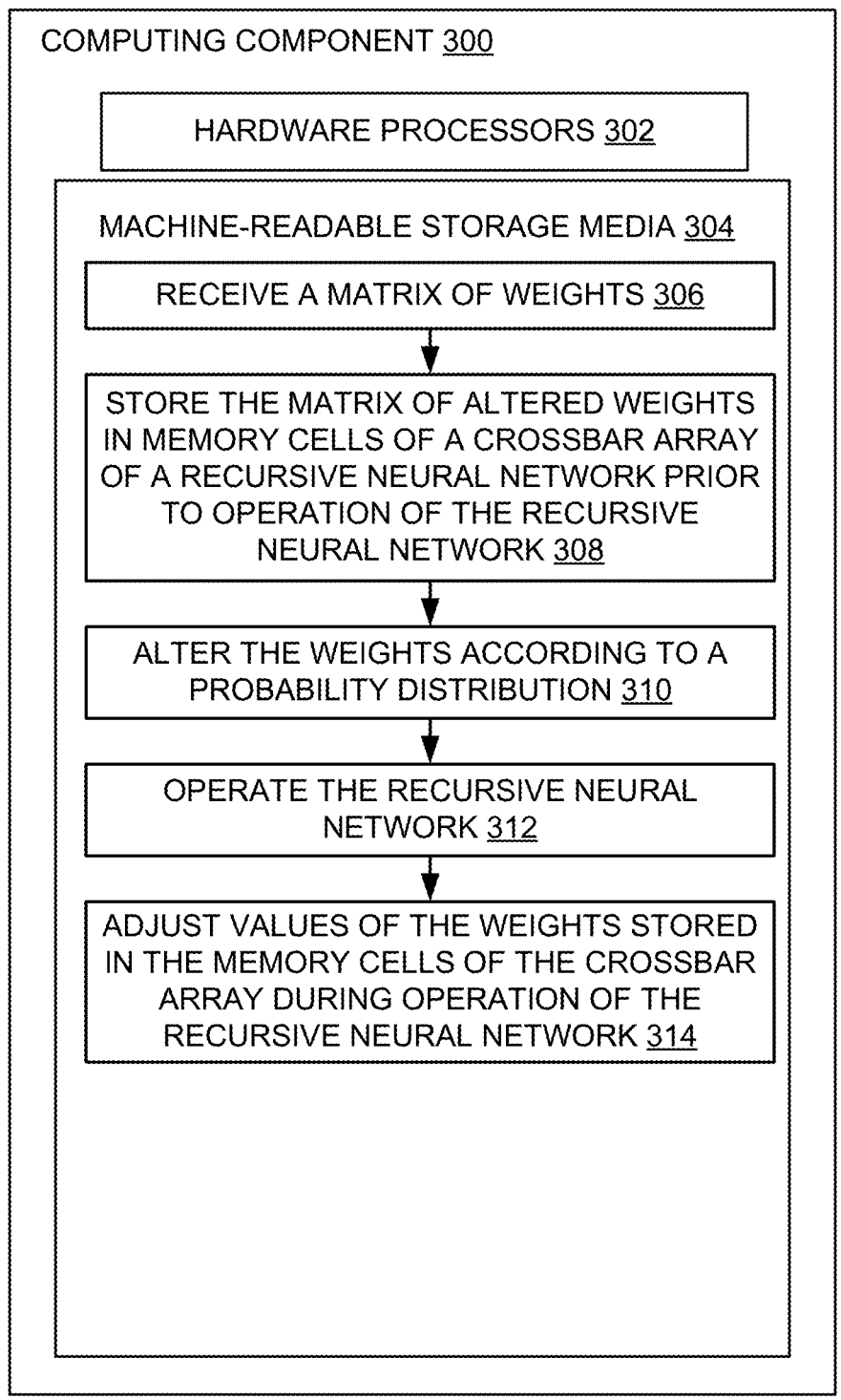
FIG. 3 is a block diagram of an example computing component or device for processing a matrix in a recursive neural network with programming fluctuation in accordance with one embodiment.

FIG. 3 is a block diagram of an example computing component or device 300 for processing a matrix in a recursive neural network with programming fluctuation in accordance with one embodiment. Computing component 300 may be, for example, a server computer, a controller, or any other similar computing component capable of processing data. In the example implementation of FIG. 3, the computing component 300 includes a hardware processor, 302, and machine-readable storage medium, 304.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-314, to control processes or operations for processing a matrix in a recursive neural network with programming fluctuation. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 302 may be a non-transitory storage medium, where the term "non-transitory" does not encompass transitory propagating signals. As described in detail below, machine-readable storage medium 302 may be encoded with executable instructions, for example, instructions 306-314.

Hardware processor 302 may execute instruction 306 to receive a matrix of weights 124. The matrix of weights 124 may be a Hamiltonian matrix representing a computationally-difficult problem such as a traveling salesman problem, or the like. However, other sorts of matrices may be employed, and may represent other sorts of problems. Hardware processor 302 may execute instruction 308 to store the matrix of weights in the memory cells G of the crossbar array 102. The crossbar array 102 may have the same dimensions as the matrix of weights 124. For example, a Hamiltonian matrix is a 2n-by-2n matrix. Accordingly, in embodiments employing a Hamiltonian matrix, the crossbar array 102 may have dimensions of 2n-by-2n.

Hardware processor 302 may execute instruction 310 to alter the weights according to a probability distribution. Any sort of probability distribution may be employed. In one embodiment, the probability distribution is a Gaussian distribution. In some embodiments, the controller 120 may alter the weight matrix 124 stored in the memory 122 of the recursive neural network system 100. In other embodiments, the controller may alter the weight matrix 124 while programming the weights into the memory cells G of the crossbar array 102. In still other embodiments, other techniques for altering the weight matrix 124 may be used.

Hardware processor 302 may execute instruction 312 to operate the recursive neural network 130. An input vector 112 is provided to the column lines C of the crossbar array 102. In response, each row line R outputs a dot product 108 of the input vector 112 and the values stored in the memory cells G of that row line R. The filters 104 filter the dot product vector 108 to generate an output vector 110, which is stored in the buffers 106. The buffers 106 provide the stored vector as a new input vector 112 to the crossbar array 102. The recursive neural network 130 may iterate in this manner until a solution is reached, that is, until the energy of the network 130 reaches a global minimum.

Hardware processor 302 may execute instruction 314 to adjust the values of the weights stored in the memory cells G of the crossbar array 102 during operation of the recursive neural network 130. For example, as the solution converges to a global minimum of the energy of the recursive neural network 130, the alterations imposed by the controller 120 according to the probability distribution when programming the crossbar array 102 may be removed by adjusting the values of the weights stored in the memory elements G of the crossbar array 102. In some embodiments, the controller 120 may record the values of the altered weight matrix 124, the values used to alter the weights matrix 124, some other representation of the alteration of the weight matrix 124, or any combination thereof. With this precise knowledge of the alterations, the controller 120 may adjust the values of the weights in the memory elements G of the crossbar array 102 precisely during operation of the recursive neural network 130.

Figure 4:
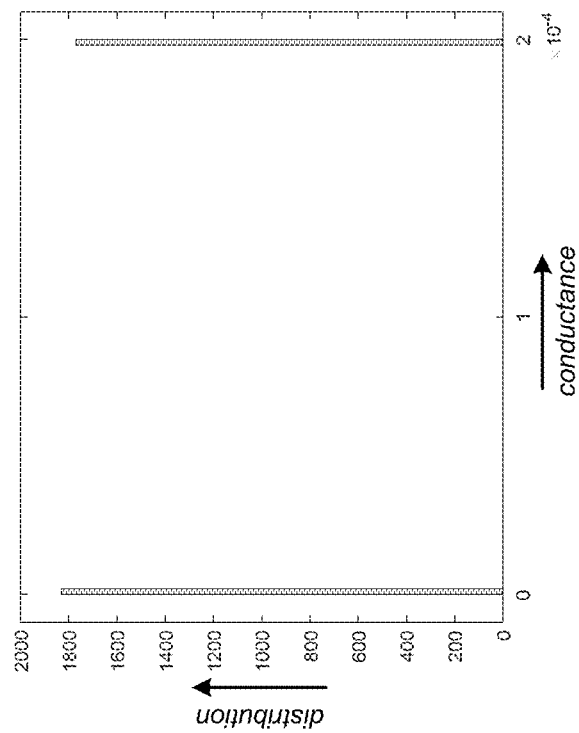
FIG. 4 illustrates programming of a crossbar array without programming fluctuation.

FIGS. 4-7 compare the programming and operation of the recursive neural network 130 with and without programming fluctuation, that is, with and without altering the weights matrix 124 according to a probability distribution. FIG. 4 illustrates programming of a crossbar array 102 without programming fluctuation. In FIG. 4, the horizontal axis represents conductance of the memory elements G in micro Siemens, and the vertical axis represents the distribution of those values. Referring to FIG. 4, all of the conductance values are either zero or two micro Siemens.

Figure 5:
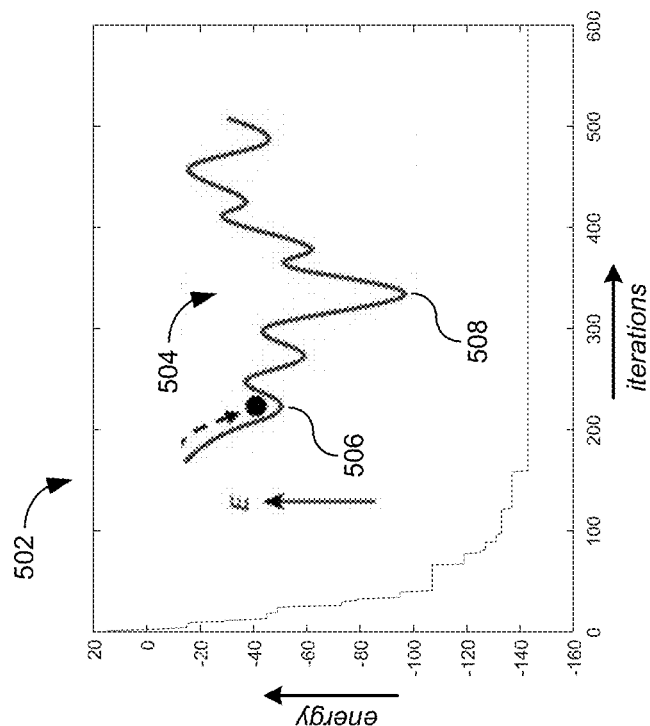
FIG. 5 illustrates the operation of the recursive neural network when programmed with the conductance values of FIG. 4.

FIG. 5 illustrates the operation of the recursive neural network 130 when programmed with the conductance values of FIG. 4. FIG. 5 includes a plot 502, where the vertical axis represents the energy of the recursive neural network 130, and the horizontal axis represents the number of iterations performed by the recursive neural network 130. In the plot 502, it can be seen that the energy of the recursive neural network 130 converges to a value of negative 141, which represents a local minimum of the energy rather than the global minimum. This is illustrated graphically at 504, where a black ball representing the energy of the recursive neural network has settled into a local minimum 506 rather than the global minimum 508.

Figure 7:
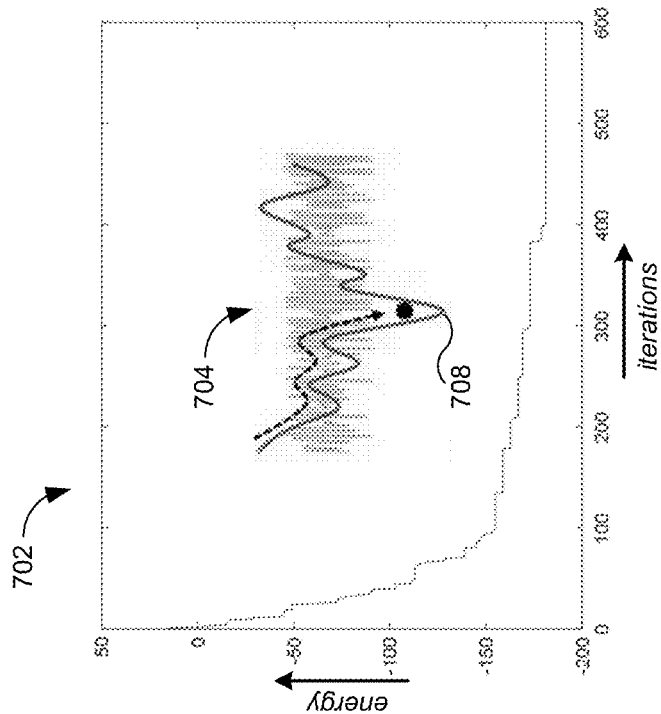
FIG. 7 illustrates the operation of the recursive neural network when programmed with the conductance values of FIG. 6.
Figure 6:
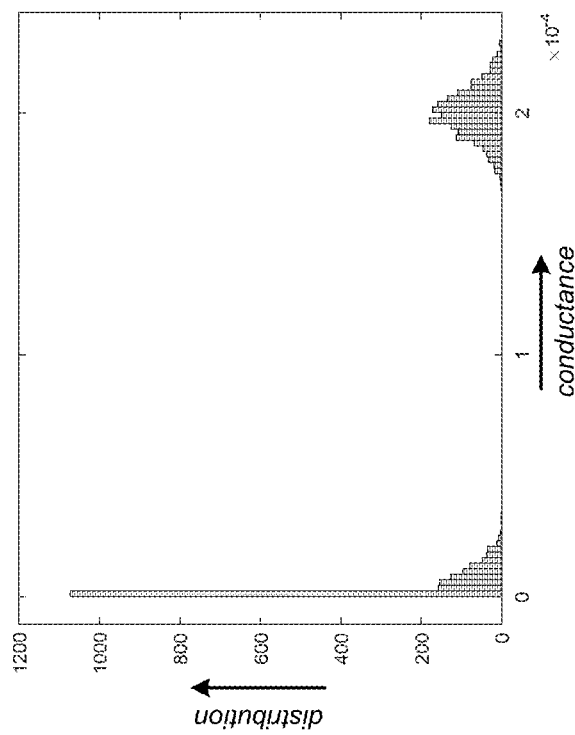
FIG. 6 illustrates programming of a crossbar array with programming fluctuation according to embodiments of the disclosed technology.

FIG. 6 illustrates programming of a crossbar array 102 with programming fluctuation according to embodiments of the disclosed technology. For example, the values of the weights matrix 124 may be altered according to a probability distribution, as described above. In the example of FIGS. 6 and 7, the probability distribution is a Gaussian distribution. In FIG. 6, the horizontal axis represents conductance of the memory elements G in micro Siemens, and the vertical axis represents the distribution of those values. Referring to FIG. 6, the conductance values are grouped near zero or two micro Siemens, but with a Gaussian distribution.

FIG. 7 illustrates the operation of the recursive neural network 130 when programmed with the conductance values of FIG. 6. FIG. 7 includes a plot 702, where the vertical axis represents the energy of the recursive neural network 130, and the horizontal axis represents the number of iterations performed by the recursive neural network 130. In the plot 702, it can be seen that the energy of the recursive neural network 130 converges to a value of negative 183, which represents the global minimum of the energy of the recursive neural network 130. This is illustrated graphically at 704, where a black ball representing the energy of the recursive neural network has settled into the global minimum 708 rather than a local minimum.

As illustrated by FIGS. 4-7, introducing fluctuations into the programming of the values of the crossbar array 102 prevent the recursive neural network 130 from converging upon a local minimum of the energy of the recursive neural network 130. Accordingly, these embodiments of the disclosed technology solve one of the major problems associated with the use of energy minimization searches in recursive neural networks.

Figure 8:
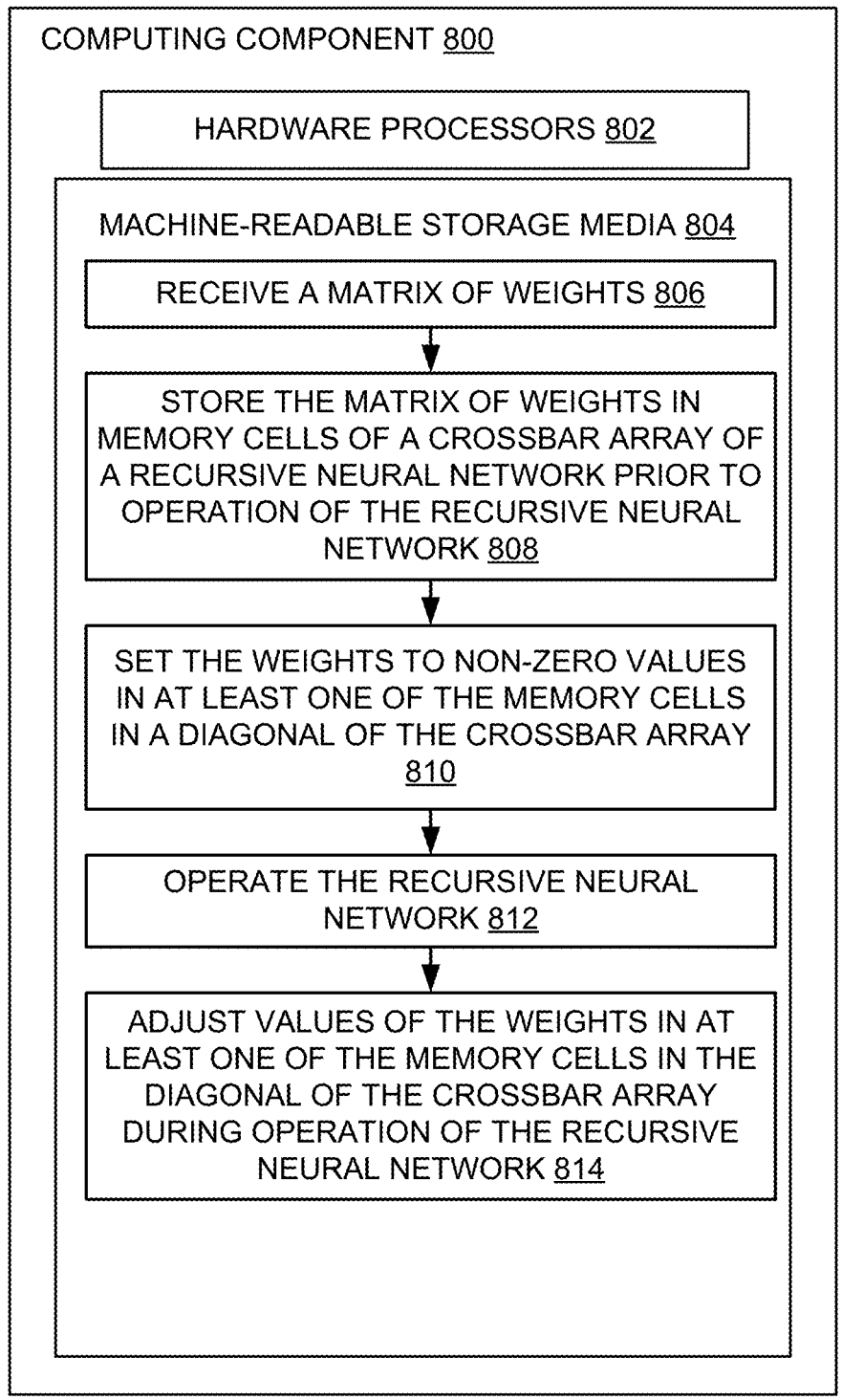
FIG. 8 is a block diagram of an example computing component or device for processing a matrix in a recursive neural network with diagonal programming in accordance with one embodiment.

FIG. 8 is a block diagram of an example computing component or device 800 for processing a matrix in a recursive neural network with diagonal programming in accordance with one embodiment. Computing component 800 may be, for example, a server computer, a controller, or any other similar computing component capable of processing data. In the example implementation of FIG. 8, the computing component 800 includes a hardware processor, 802, and machine-readable storage medium, 804.

Hardware processor 802 may be one or more central processing units (CPUs), semiconductor-based microprocessors, and/or other hardware devices suitable for retrieval and execution of instructions stored in machine-readable storage medium, 804. Hardware processor 802 may fetch, decode, and execute instructions, such as instructions 806-814, to control processes or operations for processing a matrix in a recursive neural network with diagonal programming. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 802 may be a non-transitory storage medium, where the term "non-transitory" does not encompass transitory propagating signals. As described in detail below, machine-readable storage medium 802 may be encoded with executable instructions, for example, instructions 806-814.

Hardware processor 802 may execute instruction 806 to receive a matrix of weights 124. The matrix of weights 124 may be a matrix representing a Hamiltonian of a computationally-difficult problem such as a traveling salesman problem, or the like. However, other sorts of matrices may be employed, and may represent other sorts of problems. Hardware processor 802 may execute instruction 808 to store the matrix of weights 124 in the memory cells G of the crossbar array 102.

Figure 9:
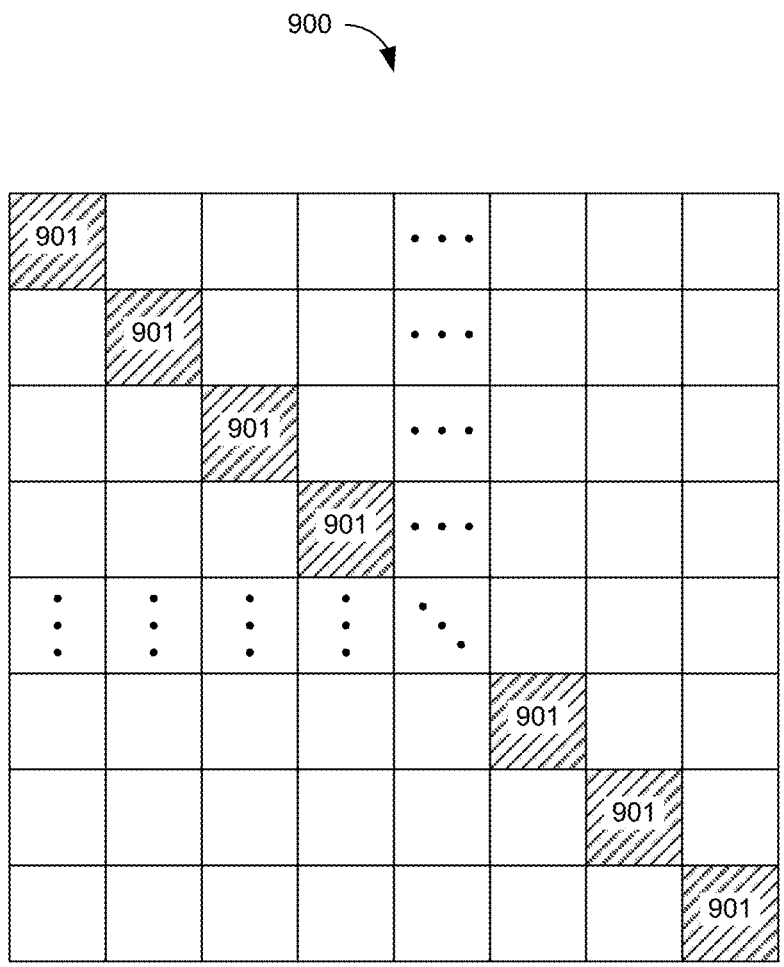
FIG. 9 illustrates the diagonal elements of a matrix.

The matrices used to solve computationally-difficult problems generally feature diagonal elements that all have zero value. One example is the Hamiltonian matrix, where the diagonal elements are all zero by definition. In problems such as quadratic unconstrained binary optimization problems, the contribution of the diagonal elements of the matrix to the figure of merit of the system, for bipolar weights, doesn't depend on the state of the system and can consequently be removed from the optimization problem, resulting in zero-value diagonal elements. But according to some embodiments of the disclosed technology, one or more of the diagonal elements may be set to nonzero values. The values of these elements may be selected to introduce controlled instability to the recursive neural network that is sufficient to prevent convergence at a local minimum. Accordingly, hardware processor 802 may execute instruction 810 to set the weights to nonzero values and at least one of the memory cells G in a diagonal of the crossbar array 102. FIG. 9 illustrates the diagonal elements 901 of a matrix 900. In the disclosed embodiments, the values of one or more of the diagonal elements 901 of the matrix 900 may be set to nonzero values. These nonzero values may be programmed after the weights matrix 124 is loaded into the crossbar array 102, before such loading, during such loading, during operation of the recursive neural network 130, or any combination thereof.

Hardware processor 802 may execute instruction 812 to operate the recursive neural network 130. An initial input vector 112 is provided to the column lines C of the crossbar array 102. In response, each row line R outputs a dot product 108 of the input vector 112 and the values stored in the memory cells G of that row line R. The filters 104 filter the dot product vector 108 to generate an output vector 110, which is stored in the buffers 106. The buffers 106 provide the stored vector as a new input vector 112 to the crossbar array 102.

Hardware processor 802 may execute instruction 814 to adjust the values of the weights in at least one of the memory cells G in the diagonal of the crossbar array 102 during operation of the recursive neural network 130. For example, as the solution converges to a global minimum of the energy of the recursive neural network 130, the values of these weights may be reduced to zero. In some embodiments, the controller 120 may record the nonzero values of the diagonal elements of the crossbar array 120 prior to operation of the recursive neural network 130. With this precise knowledge of these nonzero values, the controller 120 may adjust the values of the weights in the diagonal memory elements G of the crossbar array 102 precisely during operation of the recursive neural network 130.

In some embodiments, one or more of the diagonal memory cells G in the crossbar array 102 may include a memristor that fades to a zero value during operation of the recursive neural network 130. In such embodiments, the values of the diagonal memory cells G automatically fall to zero during operation of the recursive neural network 130. In some such embodiments, the controller 120 may adjust the values of the diagonal memory cells G as those values fall to zero.

Figure 10:
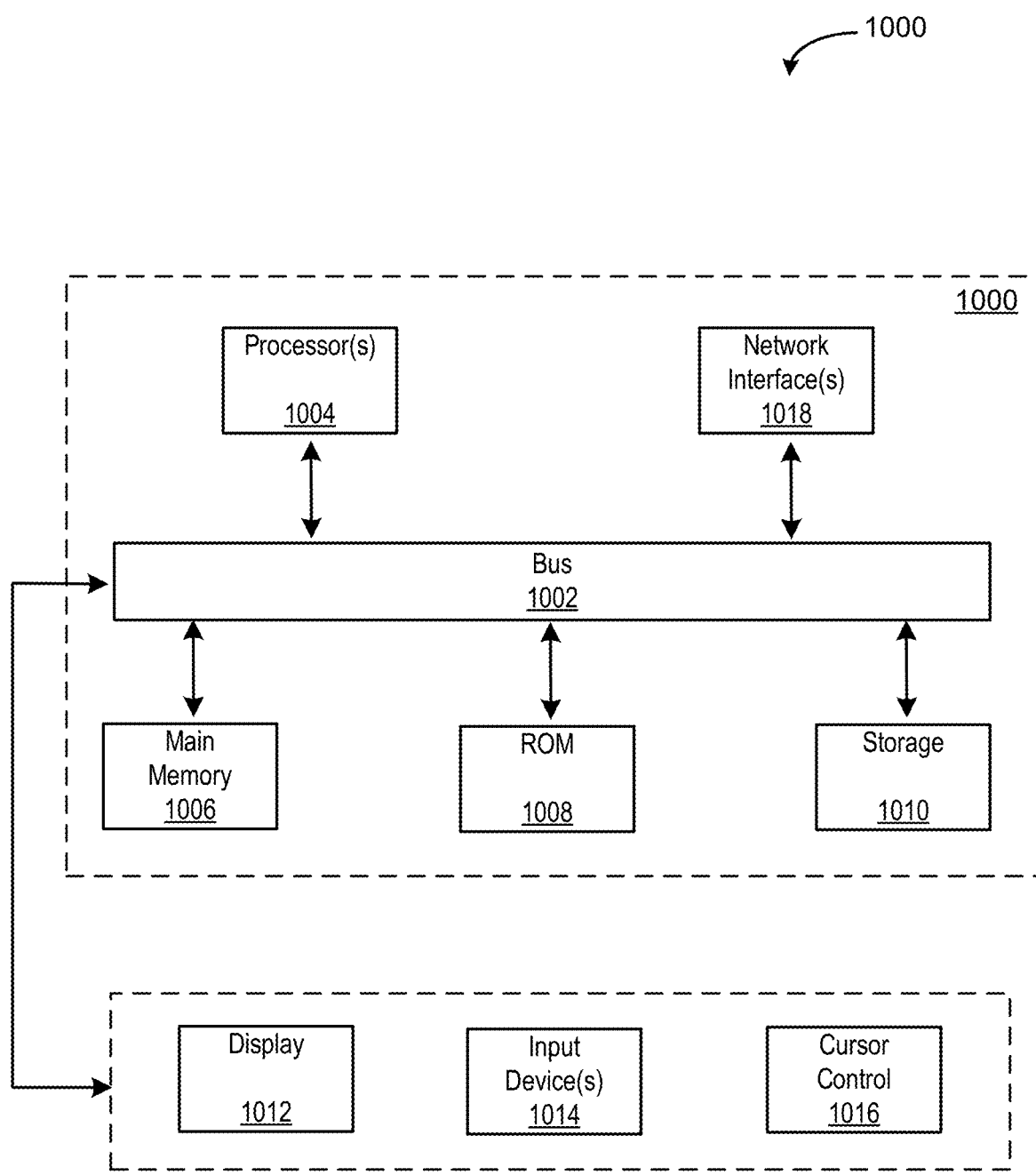
FIG. 10 depicts a block diagram of an example computer system in which various of the embodiments described herein may be implemented.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus for processing a matrix of weights, the apparatus comprising:
   a recursive neural network comprising a crossbar array, the crossbar array comprising a plurality of row lines, a plurality of column lines, and a plurality of memory cells each coupled between a respective combination of one of the row lines and one of the column lines, wherein:
   the plurality of memory cells are configured to store the matrix of weights,
   the column lines are configured to receive inputs according to an input vector, and
   each row line is configured to deliver an output representing a dot-product of the input vector and the weights stored in the memory cells coupled to the row line; and a controller configured to:

prior to operation of the recursive neural network, receive the matrix of weights comprising zero values for the weights in the memory cells in a diagonal of the crossbar array, and set the weights to non-zero values in at least one of the memory cells in the diagonal of the crossbar array, and adjust values of the weights in at least one of the memory cells in the diagonal of the crossbar array during operation of the recursive neural network, wherein the non-zero values are set to introduce noise into the recursive neural network and to prevent convergence at a local minimum during operation of the recursive neural network.

2. The apparatus of claim 1, wherein:
each of the memory cells in the diagonal of the crossbar array includes a memristor that fades to a zero value during operation of the recursive neural network.

3. The apparatus of claim 1, wherein:
the controller is further configured to store the matrix of weights in the memory cells, and to alter the weights according to a probability distribution, prior to operation of the recursive neural network.

4. The apparatus of claim 3, wherein:
the controller is further configured to adjust values of the weights stored in the memory cells of the crossbar array during operation of the recursive neural network.

5. The apparatus of claim 3, wherein:
the controller is further configured to (i) record the altered values, and (ii) alter the weights stored in the memory cells of the crossbar array, according to the recorded values, during operation of the recursive neural network.

6. The apparatus of claim 3, wherein:
the probability distribution is a Gaussian distribution.

7. The apparatus of claim 1, wherein:
each of the memory cells includes a memristor.

8. The apparatus of claim 1, wherein the recursive neural network further comprises:
a plurality of filters configured to generate a new input vector based on the outputs of the row lines.

9. An apparatus for processing a matrix of weights, the apparatus comprising:
a recursive neural network comprising a crossbar array, the crossbar array comprising a plurality of row lines, a plurality of column lines, and a plurality of memory cells each coupled between a respective combination of one of the row lines and one of the column lines, wherein:
the plurality of memory cells are configured to store the matrix of weights,
the column lines are configured to receive inputs according to an input vector, and
each row line is configured to deliver an output representing a dot-product of the input vector and the weights stored in the memory cells coupled to the row line; and a controller configured to:
store the matrix of weights in the memory cells, the matrix of weights representing a Hamiltonian matrix, alter the weights in at least one of the memory cells in a diagonal of the crossbar array according to a probability distribution, prior to operation of the recursive neural network, and adjust values of the weights in at least one of the memory cells in the diagonal of the crossbar array during operation of the recursive neural network, wherein the weights are altered to introduce noise into the recursive neural network to converge at a global minimum during operation of the recursive neural network.

10. The apparatus of claim 9, wherein:
the controller is further configured to (i) record the altered values, and (ii) alter the weights stored in the memory cells of the crossbar array, according to the recorded values, during operation of the recursive neural network.

11. The apparatus of claim 9, wherein: the controller is further configured to set the weights to non-zero values in at least one of the memory cells in the diagonal of the crossbar array.

12. The apparatus of claim 11, wherein:
the controller is further configured to adjust values of the weights in at least one of the memory cells in the diagonal of the crossbar array during operation of the recursive neural network.

13. The apparatus of claim 11, wherein:
each of the memory cells in the diagonal of the crossbar array includes a memristor that fades to a zero value during operation of the recursive neural network.

14. The apparatus of claim 9, wherein:
the probability distribution is a Gaussian distribution.

15. The apparatus of claim 9, wherein:
each of the memory cells includes a memristor.

16. The apparatus of claim 9, wherein the recursive neural network further comprises:
a plurality of filters configured to generate a new input vector based on the outputs of the row lines.

17. A method for processing a matrix of weights, the method comprising:
prior to operation of a recursive neural network,
storing the matrix of weights in memory cells of a crossbar array of a recursive neural network prior to operation of the recursive neural network, the matrix of weights comprising zero values for the weights in the memory cells in a diagonal of the crossbar array;
altering the weights according to a probability distribution;
setting the weights to non-zero values in at least one of the memory cells in the diagonal of the memory cells in the crossbar array;
operating the recursive neural network; and
adjusting values of the weights stored in at least one of the memory cells in the diagonal of the crossbar array during operation of the recursive neural network,
wherein the non-zero values are set to introduce noise into the recursive neural network and to prevent convergence at a local minimum during operation of the recursive neural network.

* * * * *